United States Patent
Lucidarme et al.

(10) Patent No.: US 7,123,910 B2
(45) Date of Patent: Oct. 17, 2006

(54) SYSTEM AND METHOD FOR MESSAGE REDIRECTION BETWEEN MOBILE TELECOMMUNICATION NETWORKS WITH DIFFERENT RADIO ACCESS TECHNOLOGIES

(75) Inventors: Thierry Lucidarme, Montigny le Bretonneux (FR); Pierre Lescuyer, Montigny le Bretonneux (FR)

(73) Assignee: Nortel Networks Limited, St. Laurent (CA)

(*) Notice: Subject to any disclaimer, the term of this patent is extended or adjusted under 35 U.S.C. 154(b) by 322 days.

(21) Appl. No.: 10/477,023

(22) PCT Filed: May 10, 2002

(86) PCT No.: PCT/EP02/05555

§ 371 (c)(1),
(2), (4) Date: Nov. 5, 2003

(87) PCT Pub. No.: WO02/091783

PCT Pub. Date: Nov. 14, 2002

(65) Prior Publication Data

US 2004/0147262 A1    Jul. 29, 2004

(30) Foreign Application Priority Data

May 10, 2001    (EP)    ................... 01401187

(51) Int. Cl.
*H04Q 7/20*    (2006.01)

(52) U.S. Cl. ............ 455/434; 455/445; 455/439

(58) Field of Classification Search ........ 455/436–442, 455/445, 450–451, 452.1, 453, 455, 456.1, 455/456.2, 464, 403, 434, 435.2
See application file for complete search history.

(56) References Cited

U.S. PATENT DOCUMENTS 5,140,627 A * 8/1992 Dahlin ................... 455/436

(Continued)

FOREIGN PATENT DOCUMENTS

EP    1009183 A1    6/2000

(Continued)

*Primary Examiner*—Sonny Trinh
(74) *Attorney, Agent, or Firm*—Bacon & ThornburgLLP

(57) ABSTRACT

Communication systems and methods are provided allowing a single mode mobile terminal to support mobile assisted signal strength measurement operations in both a fixed frequency reuse based communication network and an adaptive channel allocation based communication network. Candidate base station signal strength measurements are requested by a fixed frequency reuse type network, measured by the mobile terminal and provided to the fixed frequency reuse type network which is seeking to identify a strongest signal for mobile assisted handover operations. In addition, interference signal strength measurements are requested by an adaptive channel allocation type network, measured by the mobile terminal and provided to the adaptive channel allocation type network by the mobile terminal. No redundant circuitry is required in the mobile terminal. Instead, the mobile terminal executes the same operations using the same hardware regardless of whether the requested measurement is of a candidate signal strength or an interference signal.

21 Claims, 12 Drawing Sheets

U.S. PATENT DOCUMENTS

| | | | |
|---|---|---|---|
| 5,307,400 A * | 4/1994 | Sawyer et al. | 455/456.1 |
| 5,697,055 A * | 12/1997 | Gilhousen et al. | 455/436 |
| 5,734,980 A | 3/1998 | Hooper | |
| 6,122,263 A | 9/2000 | Dahlin | |
| 6,353,607 B1 * | 3/2002 | Valentine et al. | 370/349 |
| 6,731,739 B1 * | 5/2004 | Riihinen et al. | 379/221.01 |
| 2003/0108006 A1 * | 6/2003 | Holcman et al. | 370/331 |
| 2003/0108007 A1 * | 6/2003 | Holcman et al. | 370/331 |
| 2005/0101325 A1 * | 5/2005 | Semper | 455/436 |
| 2005/0124345 A1 * | 6/2005 | Laroia et al. | 455/437 |
| 2005/0163080 A1 * | 7/2005 | Suh et al. | 370/331 |

FOREIGN PATENT DOCUMENTS

| | | |
|---|---|---|
| WO | WO 01/11913 A1 | 2/2001 |

\* cited by examiner (Upper part)

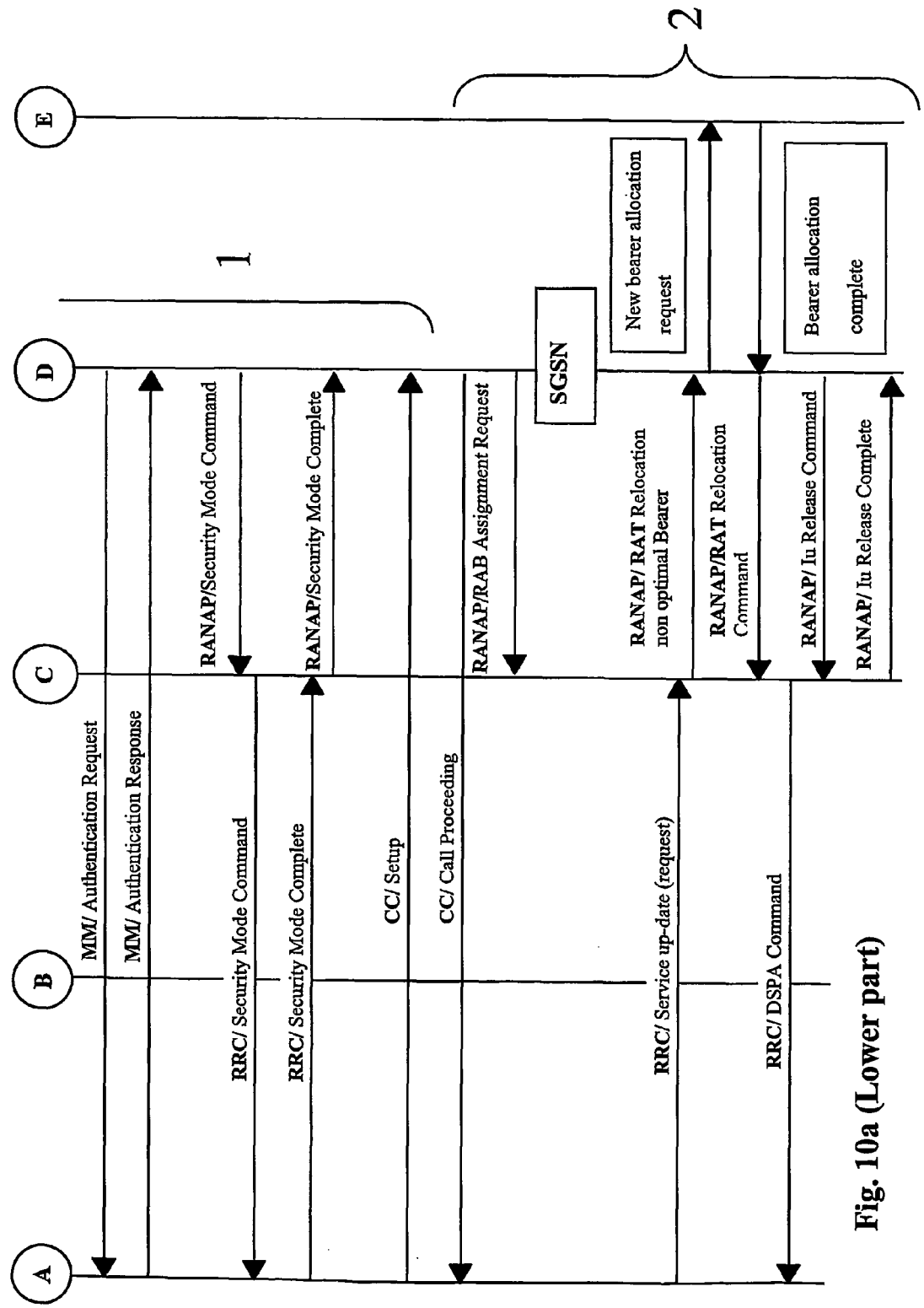
Fig. 10a (Lower part)

SYSTEM AND METHOD FOR MESSAGE REDIRECTION BETWEEN MOBILE TELECOMMUNICATION NETWORKS WITH DIFFERENT RADIO ACCESS TECHNOLOGIES

The present invention relates to methods and apparatus for the integration of differing mobile telecommunications systems, in particular for detecting, monitoring and accessing radio access networks with a variety of Radio Access Technologies (RAT's) in particular, uncoordinated radio access networks. In particular, the present invention relates to mobile terminals and network equipment for carrying out the invention and methods of operating the same.

TECHNICAL BACKGROUND

A third generation mobile telecommunications network 1 as presently proposed for the Universal Mobile Telecommunication System (UMTS) is shown in FIG. 1. It comprises a mobile terminal 2 that can be in communication with a public and coordinated mobile telephone network such as a UMTS radio access network (UTRAN) 4. The UTRAN 4 comprises a Radio Network Controller (RNC) 5 and one or more so-called "Node B" 3 each of which includes a base transceiver station. The UTRAN 4 is connected to a core network 6 which comprises two pathways: a voice message pathway via a Mobile Switching Center (MSC) 7 and Gateway MSC (GMSC) 9 providing a connection to other voice networks 10 such as a public telephone network or other mobile telephone networks (PLMN), as well as a data pathway via a Serving GPRS support node (SGSN) 11 and a Gateway GSN (GGSN) 13 to other data networks 14 such as the Internet. The core network 4 also comprises a Home Location Register (HLR) 15 for storing subscriber information and a reference to the location of mobile terminals 2 when used in combination with a Visiting Location Register (VLR) 8, each of which is associated with an MSC 7.

Third generation mobile telephone networks such as UMTS allow handovers between different systems, e.g. from UMTS to GSM and vice versa. Handover between systems can be necessary because, for instance, the GSM or UMTS network does not have the necessary geographical coverage—e.g. a mobile terminal moves out of the coverage area of one system into another, or because of congestion on one system, that is for load balancing, or to provide a different service, e.g. from UMTS to GPRS to provide specific data services.

To provide the necessary information for making the handover decision, the mobile terminal is able to make measurements of surrounding radio transmitters. Typical measurements are:

intra-frequency measurements on downlink physical channels at the same frequency or frequencies as the mobile terminal is using, inter-frequency measurements on downlink physical channels at a frequency or frequencies that differ from the mobile terminal is using, inter-system measurements on downlink physical channels belonging to a different radio access system, traffic volume measurements on uplink traffic load, quality measurements of quality parameters, internal measurements of mobile terminal transmission power and received signal level, measurements for implementation of Location Services, e.g. time of arrival information of various radio sources which may be used to provide a location for the mobile terminal.

In addition the mobile terminal requires supplementary information such as cell information which allows the mobile terminal to monitor the various signals mentioned above. The mobile terminal sends measurement reports when certain criteria are met, e.g. periodically or event driven. The results of the measurement may be sent in a measurement report. Each measurement report is sent with a measurement identity number.

Inter-system handover from UMTS to GSM and vice-versa for FDD outdoor systems are shown schematically in FIGS. 2 and 3, respectively. With reference to FIG. 2, a mobile terminal 2 is shown in communication with a UMTS radio access network (UTRAN) 4. The UTRAN 4 requests a measurement report either via a system information block (SIB type 11 or 12) on a broadcast channel or via a measurement control message on a dedicated channel. In these messages the UTRAN 4 provides the cell parameters of neighboring cells including those in other systems. These parameters are required to be able to perform measurements on candidate cells. The mobile terminal 2 provides the measurement report to UTRAN 4 on a dedicate channel. Based on the report a network element of the UTRAN 4 such as a Radio Network Controller (RNC) decides on the handover. The RNC sends a resource reservation request through to the target base station system (BSS) 16 of the GSM system via the relevant Mobile Switching Center (MSC) 17. BSS 16 sends a resource reservation acknowledgement and a GSM handover command to the RNC of the UTRAN 4. Subsequently, the RNC sends a handover from UTRAN command with the GSM handover command piggybacked on it. The mobile terminal 2 the changes to GSM and sends a handover access message to the base station transceiver of the target BSS 16. After handover is complete the BSS 16 initiates release of the radio resources in the UTRAN network, 4.

The reverse procedure is shown schematically in FIG. 3. Due to the similarity between UMTS and GSM, this procedure is similar to the one described with reference to FIG. 2. However, as the UTRAN handover command may be bigger than can be piggybacked in GSM, a pre-configuration mechanism is use, i.e. a reference number, each for a pre-defined set of UTRAN parameters.

The above described system handovers require close co-operation between the two systems. In particular, each system is subject to change, such as changing cell sizes, cell frequency allocations, number of cells. This information is communicated from on system to another via the Operation & Maintenance System (OMS). Two systems in which system information is exchanged between the relevant OMS will be called "coordinated systems". This level of co-ordination however becomes increasingly difficult to implement as the number of alternative systems increases. The number of possible system handovers explodes rapidly, specially when multi-mode mobile terminals are used. A non-exhaustive list of systems follows which have different Radio Access Technologies (RAT's) and which might be relevant for a system change between any two: UMTS Frequency Division Duplex (FDD), UMTS Time Division Duplex (TDD), Multicarrier CDMA, GSM, GPRS/GSM, EGPRS/UTMS (GERAN), CDMA 2000, DECT, HIPERLAN/1 or /2, BLUETOOTH, OFDM (Orthogonal Frequency Division Multiplex) Local Area Networks. These radio access networks have different frequency ranges, different data rates, different modulation methods, etc. A testbed for such a multi-network has been described in "First step toward an IP-based VHE" by Morand et al., 3G Mobile Communication Technologies, 26–28 Mar. 2001, Conf Publication No. 477 IEE London. The networks considered were LAN, WLAN, UMTS and PSTN. Handover is managed by Mobile IP. Mobile IP is a protocol that provides address mobility on an IP network such as the Internet i.e. seamless transparent access to the Internet providing solution for the mobile nodes to move and attach anywhere on the Internet. However, it does not specify how a wireless message redirection or handover is to be carried out.

The present methods of dealing with change from one RAT to another require extensive knowledge to be available as to the protocols and parameters of the other candidate systems a mobile terminal might use.

The article "Blind radio access technology discovery and monitoring for software defined radio communication systems: problems and solutions", Vardoulias et al., pages 306–310, 3G Mobile Communication Technologies, 26–28 Mar. 2001, Conf. Publication No. 477, IEE London describes some details of software defined reconfigurable mobile terminals capable of detecting and monitoring alternative RAT's which are net necessarily coordinated with a public mobile telephone system. However, a network organization in which these terminals may work is not discussed.

It is an object of the present invention to provide systems, apparatus and methods to allow a change of RAT even between uncoordinated radio access networks.

SUMMARY OF THE INVENTION

The present invention relates to Dynamic System Performance Adaptation (DSPA) and in particular to DSPA between uncoordinated radio access networks having different RAT's.

The present invention may provide a method of operating at least a first and a second mobile telecommunications network connected through at least one common node, a mobile terminal being in radio communication with the first mobile telecommunications network, the method comprising the steps of:

the mobile terminal scanning a frequency spectrum and identifying at least a potential radio access network;

the mobile terminal communicating a report of the results of the scan to the first network, the mobile terminal sending a message to the first telecommunications network with a request for specific mobile telecommunications service, the first network deciding in response to the report and the request which of the radio networks detected by the scan of the mobile terminal is suitable for the requested service, and the first radio network requesting the common node to redirect at least a part of the communication to the second network. The service is typically a traffic service, i.e. the provision of a radio bearer suitable for transfer of data and/or voice traffic. The OMS of the first and second mobile telecommunications networks need not be coordinated. The mobile terminal is the initiator of the process by making a service request which results in a message redirection or a RAT handover. For instance, the mobile may be able to detect the pilot or beacon signal or the presence of a HIPERLAN local area network and the user decides to switch to this network if the current download rate is too slow on the current system or the file is too big and the HIPERLAN alternative is likely to provide a quicker solution. Alternatively, beacon signals of every system could contain information indicating which potential data rate the user could use taking into account the present load on each system. The mobile terminal scans the available spectrum based on and using any relevant information stored locally in the mobile terminal, e.g. in its SIM card memory, relating to available radio networks. This information is predefined into the SIM card and can be updated on a regular basis by any suitable procedure such as the SIMTool for reconfiguration of the user identity module in the mobile terminal, e.g. a SIM card module.

The present invention may provide a system having at least a first and a second mobile telecommunications network connected through at least one common node, a mobile terminal being in radio communication with the first mobile telecommunications network, comprising:

means in the mobile terminal for scanning a frequency spectrum and identifying potential radio network sources;

means in the mobile terminal for communicating a report of the results of the scan to the first network, means in the mobile terminal for sending a message to the first telecommunications network with a request for specific mobile telecommunications service, means in the first network for deciding in response to the report and the request which of the radio network sources detected by the scan of the mobile terminal is suitable for the requested service, and means in the first radio network for requesting the common node to redirect at least a part of the communication to the second network. The service is typically a traffic service, i.e. the provision of a radio bearer suitable for transfer of data and/or voice traffic.

The present invention also includes a network element for use with at least a first and a second mobile telecommunications network, comprising:

means for receiving from a mobile terminal in radio communication with the first mobile telecommunications network a report of the results of a scan of a frequency spectrum and identification of potential radio network sources, means for receiving from the mobile terminal a request for specific mobile telecommunications service, and means for deciding in response to the report and the request which of the radio networks detected by the scan is suitable for the requested service, and means for requesting redirection of at least a part of the communication to the second network. The service is typically a traffic service, i.e. the provision of a radio bearer suitable for transfer of data and/or voice traffic.

The present invention also includes a multi-mode mobile terminal for communications with a plurality of mobile telecommunications networks, comprising:

means to scan a frequency spectrum and to identify potential radio network sources, means to generate and transmit a report to one of the mobile telecommunications networks, and means to transmit a request for a specific mobile telecommunications service.

The service is typically a traffic service, i.e. the provision of a radio bearer suitable for transfer of data and/or voice traffic.

The present invention will now be described with reference to the following drawings.

DESCRIPTION OF THE ILLUSTRATION EMBODIMENTS

Figure 1:
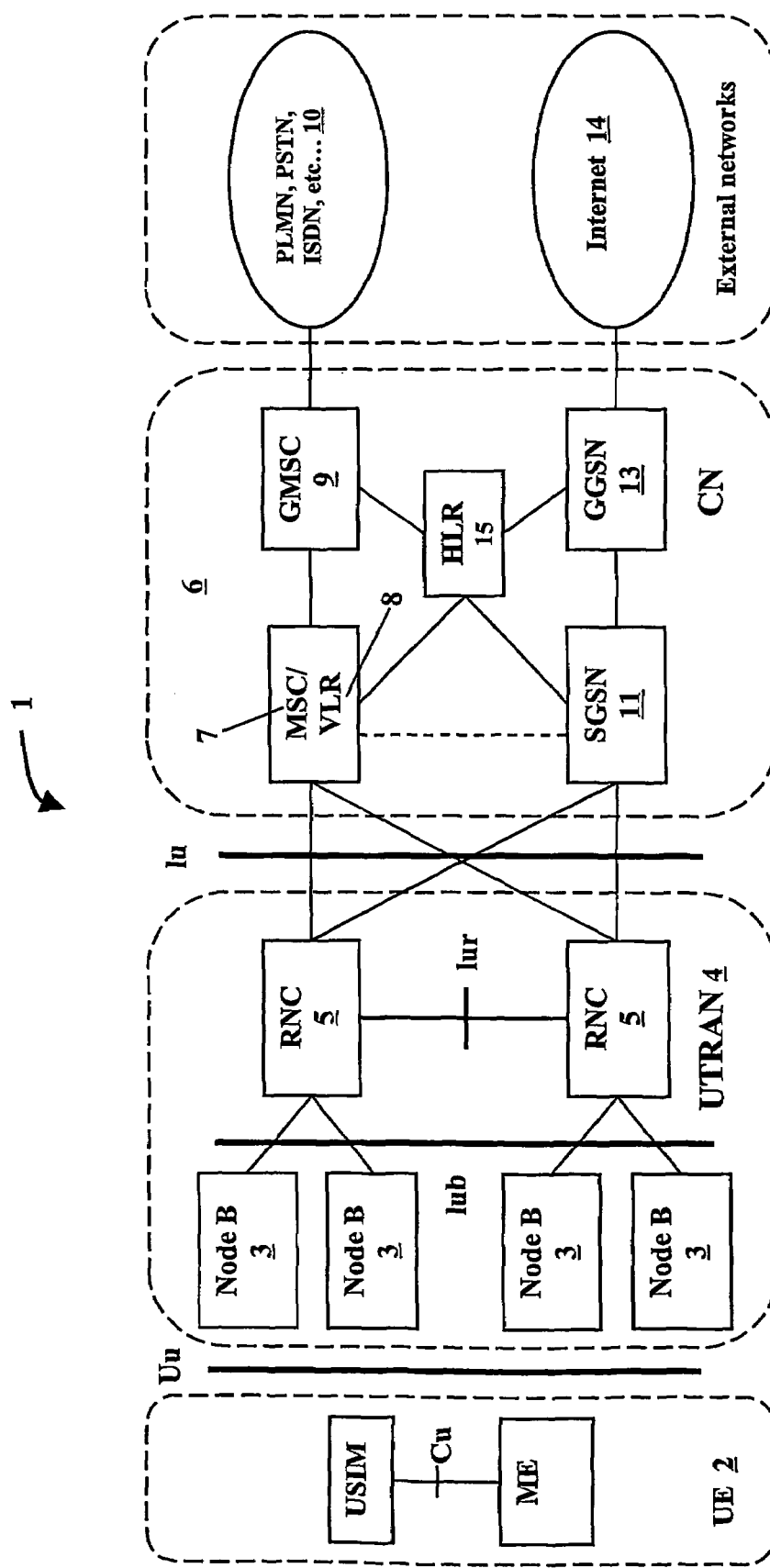
FIG. 1 shows a conventional mobile telephone network.
Figure 2:
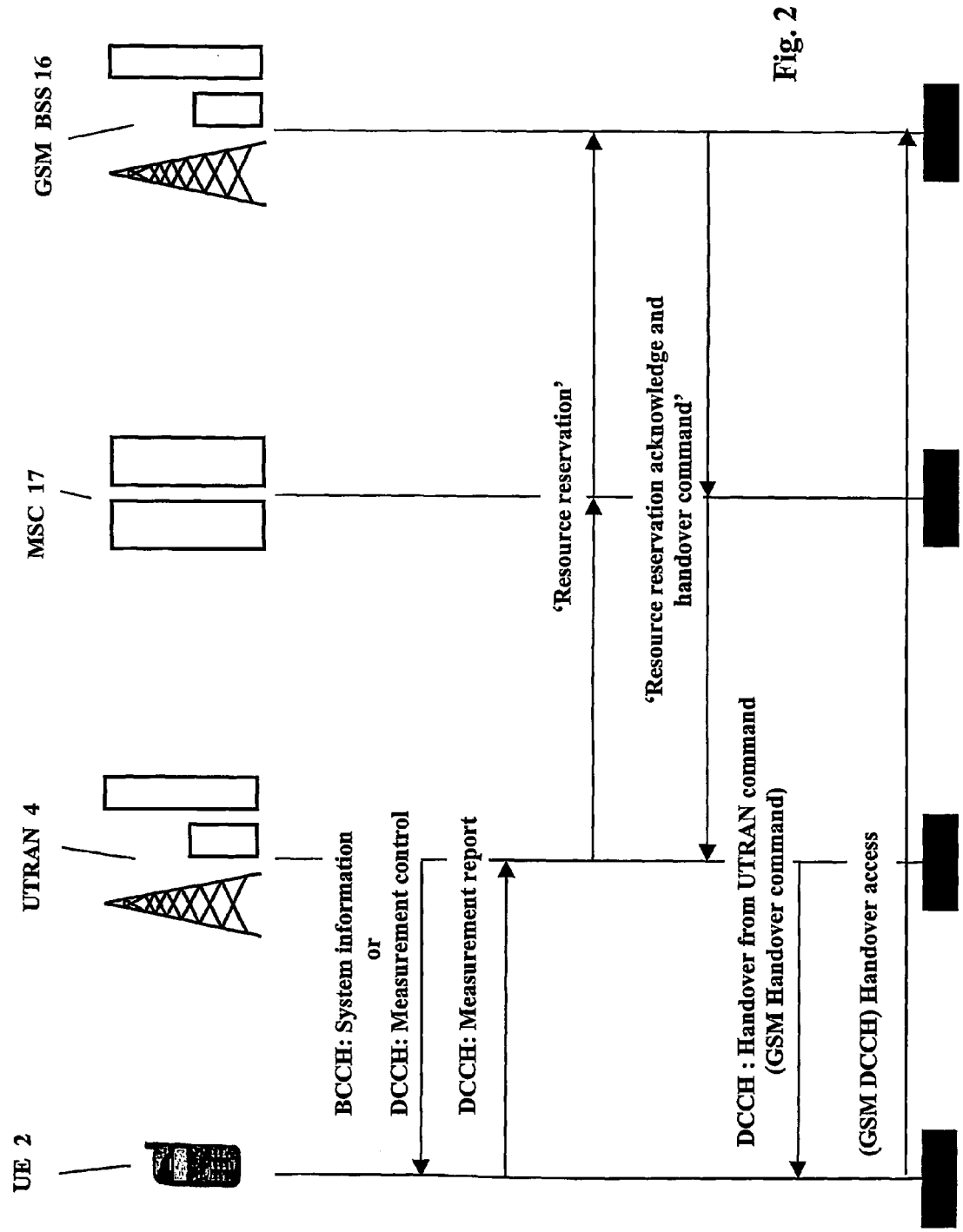
FIG. 2 shows a message flow of a conventional UMTS to GSM handover.
Figure 3:
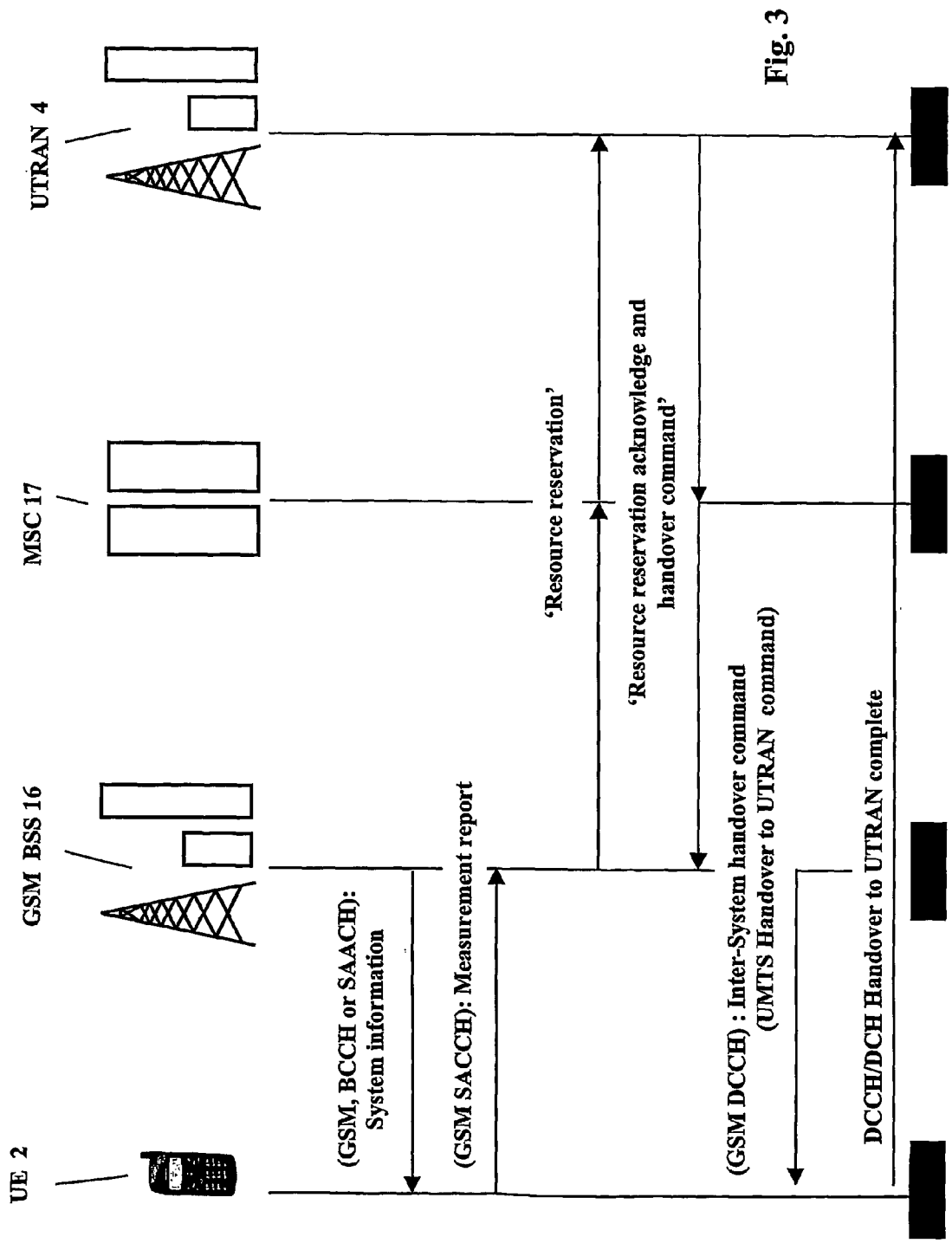
FIG. 3 shows a message flow of a conventional GSM to UMTS handover.
Figure 4:
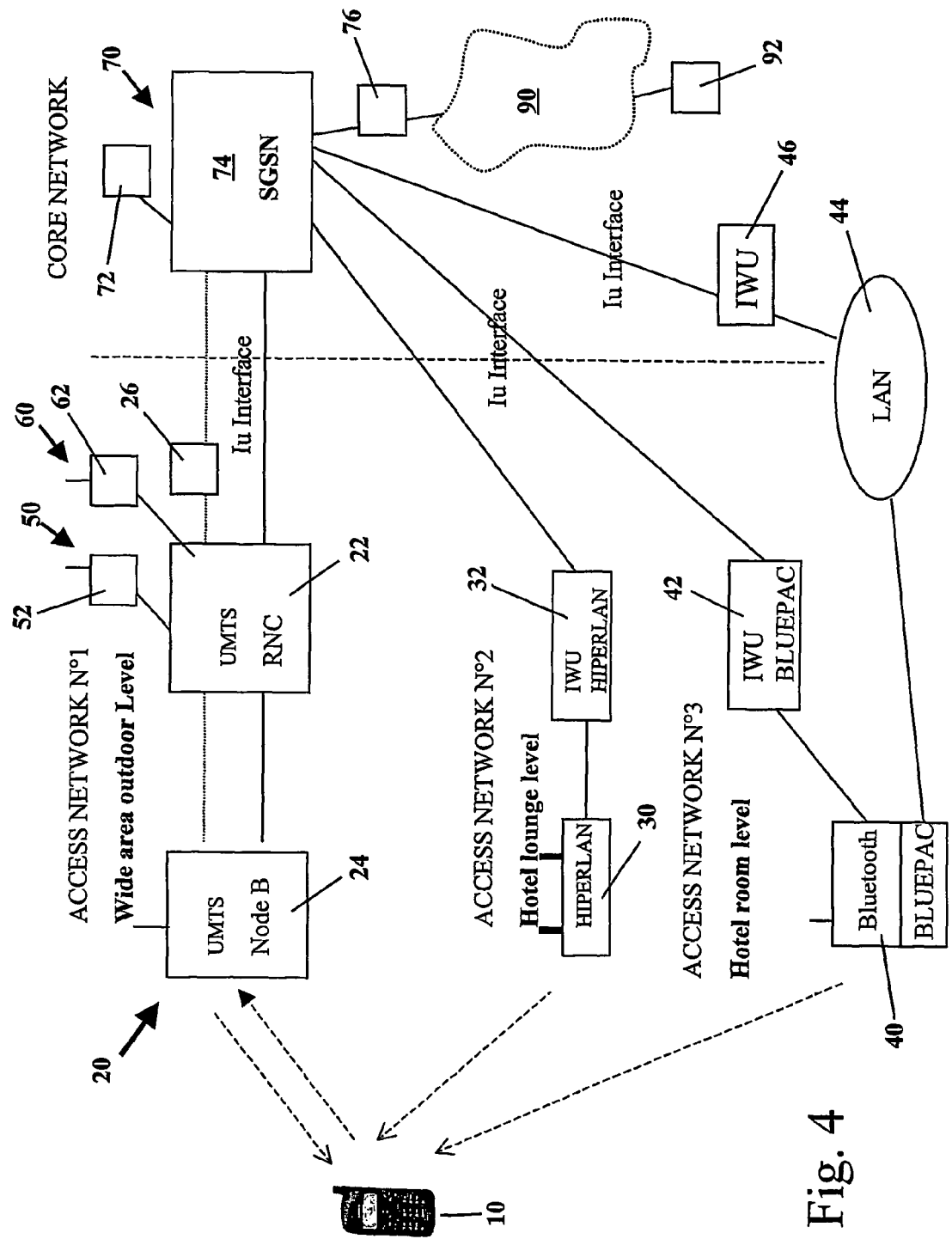
FIGS. 4 to 8 show a multi-system mobile telephone network in accordance with an embodiment of the present invention.

The present invention will be described with reference to certain drawings and embodiments but the present invention is not limited thereto but only by the attached claims.

FIGS. 4 to 8 show schematic representations of a multi-access mode mobile telephone system in accordance with embodiments of the present invention including at least two radio access networks, e.g. an outdoor mobile cellular telephone system 20 e.g. wideband or narrow band, such as a UMTS, GSM, IS 95 or IS-136 public mobile telephone network, a private radio Local Area Network 30, such as a HIPERLAN/1 or /2 network in a hotel lounge, a private personal radio access network 40 such as a BlueToooth local access network which may be connected to a Local Area Network 44 and be part of a BLUEPAC access network, e.g. in supermarket, a railway station or an airport. Information on GSM systems can be found in the book "The GSM System of Mobile Communications", by Mouly and Pautet, Cell & Sys, 1992. Information on the IS-936 system can be found in the book "IS-136 TDMA Technology, Economics and Services", by Harte, Smith, Jacobs, Artech House, 1998. Information on the IS-95 system can be found in the books "CDMA Systems Engineering Handbook", Lee and Miller, Artech House, 1998 and "CDMA for Wireless Personal Communications", Prasad, Artech House, 1996. Information on wideband CDMA such as UMTS systems may be found in the books "WCDMA for UMTS", by Holma and Toskala, Wiley, 2001 and "Wideband CDMA for third generation mobile communications", Ojanperäand Prasad, Artech House, 1998. The BLUEPAC system is described in the article "IP Services over BlueTooth: leading the way to new mobility", by Albrecht et al. IEEE, 1999. The design and construction of Wireless LAN's is discussed in detail in, for example, "Wireless LAN's" by Jim Geier, Macmillan Technical Publishing, 1999. Any of the networks may be cellular networks.

In addition the public outdoor network 20 may have an optional public OFDM access network 50 via an OFDM base station 52. OFDM systems are described in "OFDM for wireless multimedia communications", R. Van Nee and R. Prasad, Artech House, 2000.

Alternatively or additionally, a unidirectional high bandwidth downlink TDD network 60 may be provided as described in the co-pending PCT Application PCT/EP01/01089 and co-pending EP patent application EP 00400275.4 which are incorporated herein by reference. The unidirectional network 60 is associated with the UMTS network 20 or with another FDD network such as a GSM network, i.e. the UMTS or GSM network provides handover, access capabilities and error correction capabilities for the unidirectional network 60.

Multi-mode mobile terminals 10 are capable of operating in any one of several modes in order to be able to access each one of the above networks. The mobile terminals 10 may be any suitable mobile units, e.g. hand held mobile phones, or laptop or palm top computers adapted for mobile telephony. They may be software defined reconfigurable mobile terminals as described in the article by Vardoulias et al. mentioned above but modified I accordance with the present invention.

In the following embodiments of the present invention will be described with reference to the outdoor network 20 being a UMTS network, for instance WB-CDMA, in its FDD or TDD modes but the present invention is not limited thereto. Other suitable networks are, for instance, second generation systems such as GSM, IS-136 (DAMPS), IS-95, or other 3G alternatives like GPRS, EGPRS (GPRS+EDGE), GERAN or CDMA2000 derived proposals, those described above or any other suitable systems. The system shown in FIGS. 4 to 8 may be based on an ATM network and/or may conform to the 3GPP all IP Reference Architecture (3GPP, 2000, 3G TS 23.992). It also may conform to the all IP reference network architecture prepared by the Mobile Wireless Internet Forum (MWIF, 2000, MTR-4, "MWIF Network Reference Architecture", Draft 0.7).

The outdoor network 20 is connected to a core network 70 to form a public mobile telephone network. Core network 70 may be operated in a variety of ways to offer services to peripheral networks such as networks 20–60. The core network 70 includes a home location register (HLR) 72 which stores information relevant to all mobile terminals 10 under the control of the core network 70. The HLR 72 is a database which stores subscriber data, such as location data for each mobile terminal as well as Subscriber Identification Information. The core network 70 may provide HLR services to other networks such as the private radio LAN 30 or the private personal access network 40 or these may have there own local HLR. Within the concepts proposed for Mobile IP protocol, the core network 70 can provide the services of a home network, i.e. by providing a home agent (for a reference to Mobile IP see C. Perkins, "IP Mobility" RFC 2002, 1996—see for example http://www://IETF.org: RFC 2005 (applicability statement for IP mobility support), RFC2002 (defines mobile IP protocol itself), RFC2003, RFC2004, RFC1701, 2006, 2344, 2356, 1825, 1826, 1827.

The core network 70 may provide authentication and encryption services (key management) for the peripheral networks 20–60. The core network 70 does not need to have base station transceivers and actually provide air interface mobile services—it may be solely a service provider to such networks. The core network 70 can also provide routing and switching services to and from other networks such as a public telephone network 80 and/or a wide area multimedia telecommunications network 90 such as the Internet. The core network 70 may also provide centralized billing services for any of the networks 20 to 60. Core network 70 may also provide certain signaling services without providing routing and switching of traffic messages. For example, the core network 70 may provide billing, location and authentication services independently of the traffic routing (which takes place in other networks).

The private networks 30, 40 are typically not coordinated with the UMTS network 20. That is, the OMS 26 of the UMTS network 20 is not informed of and/or does not record changes implemented on the private networks 30, 40. In the present invention reference will be made to "OMS" to mean the operations and maintenance system of a mobile telecommunications network and this term is intended to include terms such as OMC-R, OMC-B, OMC-S, OMC-D, and OMC-T. Hence, there is no update facility between the two networks. Uncoordinated status does not preclude that certain information is available in UMTS network 20 and/or on a mobile terminal 10 about networks 30, 40. For instance, where a mobile terminal 10 is registered on the UMTS network 20, i.e. it is its "home" network, details of the permissions and options available to mobile terminal 10 may be recorded in the UMTS network 10. For instance, such information may be stored in the HLR 72. However, this information relates to coordination between the UMTS network 20 and the mobile terminal 10, e.g. by an authentication procedure which is carried out between the UMTS network 20 and the mobile terminal 10. Such a coordination does not involve networks 30, 40 directly. These are under the control of a local network administrator who carries out changes on these networks without reference to the public UMTS network 20. Access to the private networks 30, 40 may be "blind", that is a mobile terminal 10 is not informed by the OMS 26 of UMTS system 20 of specific system details of the private networks required to detect and acquire access to the networks 30, 40. Note that a mobile terminal 10 may be informed about these networks by other means, e.g. by downloading information from a server on the Internet providing such details, by a cell broadcast on the UMTS network 20, that is a customized message originating from a request by the operators of networks 30, 40. Alternatively, system details may be provided to a mobile terminal 10 via the Short Message Service, SMS, e.g. as part of a location service triggered by the location of the mobile terminal.

In the following reference will be made to data transmissions such as would be required to access the Internet and to interrogate remote server applications and access services such as downloading graphics, text and other files although the present invention is not limited thereto.

The core network 70 also comprises an SGSN 74 for handling packet switched data. The SGSN 74 is connected to an Interworking Unit (IWU) 32, 42, 46 associated with each of the networks 30, 40, 44 or to an RNC in the networks 20, 50 and 60 and a GGSN 76 to the Internet 90. With respect to the BlueTooth network 40 two alternative connections may be made to the SGSN 74. Firstly, the SGSN 74 may be connected to a BluePac interworking unit 42. In this arrangement the IWU 42 may be a network element on a LAN 44, however, the LAN is controlled by conventional LAN software, e.g. server software, and it sees the IWU 42 merely as another network element. Alternatively, the SGSN 74 is connected to an IWU 46 of the LAN 44. In this case there is no connection between the SGSN 74 and the IWU 42 and the IWU 46 acts as a gateway to the LAN 44 for mobile telephone services. The IWU 46 can communicate with IWU 42 for the organization of mobile services and base stations on the LAN 44. Alternatively, IWU 42 and 46 may be implemented as a single gateway to the LAN 44.

In this embodiment, the SGSN 74 is a common node linking all the networks 20 to 60. The UMTS network 20 comprises an RNC 22 and a "node B" 24 including a base transceiver station. The connection between each IWU 32, 42, 46 and the SGSN 74 is preferably a direct line, e.g. a leased landline. However, the connection to IWU's 32, 42, 46 may be via the Internet, for example. This is less preferred as delays may be introduced in set-up time for handovers.

A multi-mode mobile terminal 10 is associated with the UMTS network 20. For instance, the mobile terminal may be communicating via the UMTS access network 20 and the core network 70 with a remote server 92 connected to the Internet 90. For example, the mobile terminal 10 may be surfing the Internet using the WAP protocol. Many Internet applications require high bandwidths—some of which may exceed the bandwidth which can be provided by a UMTS air interface or by a specific heavily loaded UMTS air interface.

Figure 5:
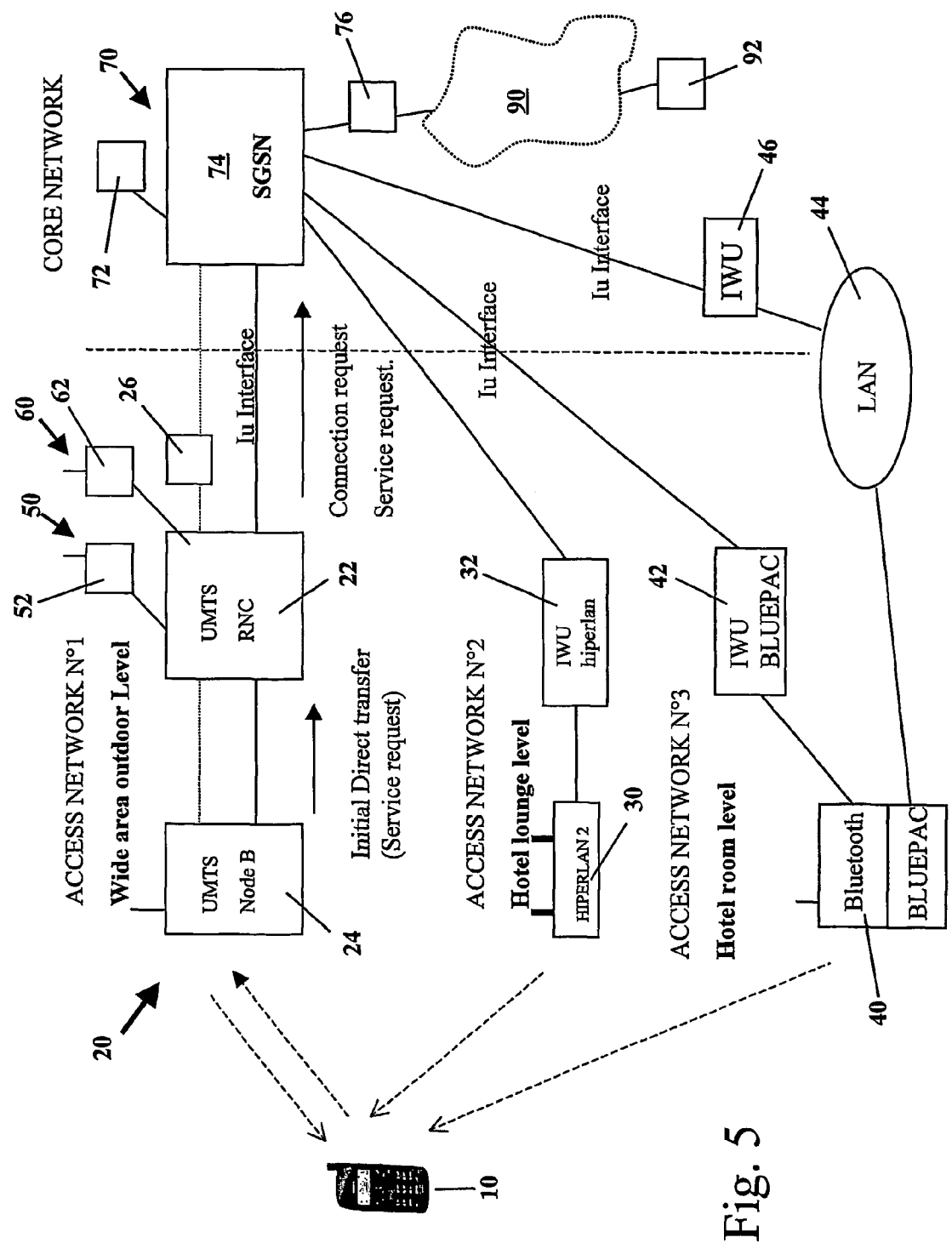
Figure 6:
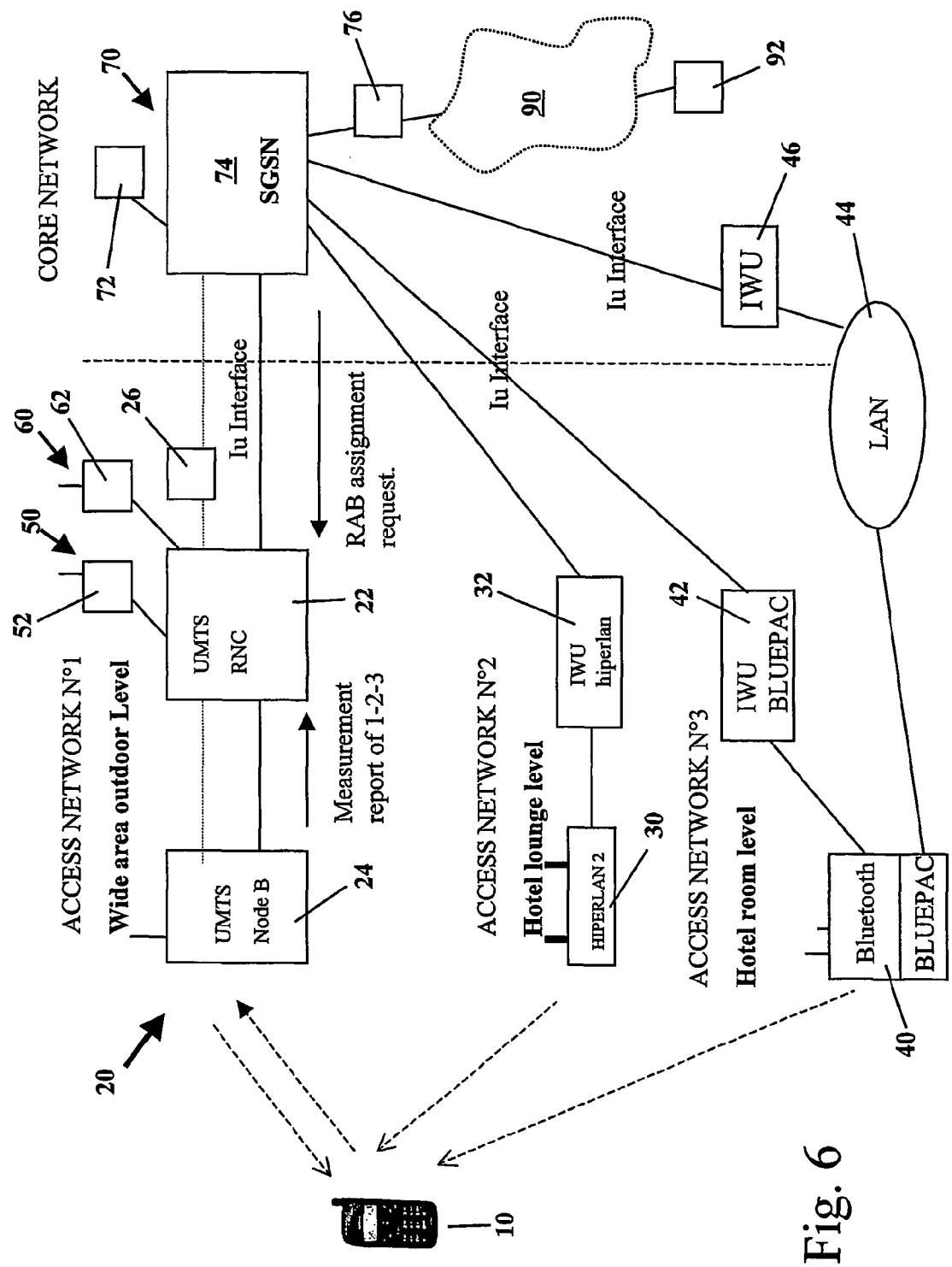

In the following a first embodiment of the present invention including a redirection or handover from the UMTS network 20 to another network 30, 40, 44 will be described. One aspect of the present invention is that the mobile terminal 10 can make a service request to the UMTS network 20, e.g. a request for a certain Quality of Service requirement (FIG. 5). The service request may be a packet switched data service request rather than a circuit switched, e.g. real-time speech request. The QoS requirements specified in the request may be, for instance, one or more of the data rate, bandwidth needed, as well as the allowable transmission delay. This service request may be sent with any appropriate message in an active state (not in an idle state), e.g. with a Radio Resource Control (RRC) connection request with which a mobile terminal requests setting up of a connection, an Initial Direct Transfer or Uplink Direct Transfer message, a Cell Update on a suitable channel such as the Random Access Channel (RACH) or a dedicated channel. In UMTS, the RRC connection is there whatever the type of active service. There are four states of an RRC connection presently defined in the UMTS standards. The request message can be sent on an RRC connection in any of these four states. In the Cell_DCH state a dedicated physical channel is allocated to the terminal. In the Cell_FACH state no dedicated channel is allocated but a RACH (Random Access CHannel) or a FACH (Forward Access CHannel) is used instead. In the Cell_PCH state the terminal can only be reached on the PCH (Paging CHannel). To perform a cell update the terminal moves to the Cell_FACH state. The URA-PCH is similar to the Cell_PCH state. The request message can take be sent after the RACH or the first RAB assignment request inside an RRC message, when the data or the voice communication has already started to be sent.

The service request is received by the RNC 22 via the node B 24. The RNC 22 first examines the request to see if it involves a packet switched service to be routed via the SGSN 74 or a circuit switched service to be routed via the MSC 78. In the case of a packet switched service the RNC 22 responds by requesting a radio resource from the SGSN 74, i.e. a request for a Radio Access Bearer (RAB).

To assess an optimized access network for this service the RNC 22 requires measurement information from the mobile terminal 10. A measurement report may already be available having been sent previously, may be sent with the service request or may be sent after a measurement control message has been sent from the RNC 22 (FIG. 6) on a dedicated channel to the mobile terminal 10. The measurement report comprises measurement values of radio networks which are in receiving range of the mobile terminal 10, for example, the HIPERLAN 30 and/or the BlueTooth personal access network 40. The mobile terminal 10 has certain information about all available networks which it stores on local memory. A mobile terminal 10 has local memory and, a microprocessor either integral with the mobile terminal or included in an integrated circuit card known as a Subscriber Information Module or SIM card. The network data can be updated at regular intervals using a Simtool kit. The measurement report constructed by the mobile terminal 10 is based on scanning the available frequencies and detecting and measuring available radio sources.

It is preferred if the mobile terminal 10 initiates the RAT redirection or handover even if it is a network element of the UMTS network such as the RNC 22 which makes the final decision over the handover execution.

In one embodiment, the mobile terminal 10 scans available radio spectrum rather than receiving specific instructions via the UMTS network 20 or other means as to cells and frequencies to monitor. By scanning all available radio spectrum and identifying potential radio networks a maximum of flexibility in system handover is provided thus providing the best opportunity for the QoS requirements to be met successfully. However, a complete scan requires time. Often, a mobile terminal 10 can collect information as to other available radio access networks over a protracted period of time, e.g. remains in one locality. However, if the mobile terminal 10 is moving quickly this may not be possible.

The mobile terminal 10 may make a blind access to any of the networks 20 to 60. This procedure requires scanning the available frequency spectrum and detecting radio access networks. This scanning procedure may be shortened in time if the networks 20 to 60 are configured to allow fast detection and access. For example:

Each network 20–60 may broadcast system information on a global pilot channel. In this case, the mobile terminal 10 only has to listen to the global channel.

Each network 20–60 can broadcast a network identity reference on its own beacon or pilot channel which allows each mobile terminal 10 to identify the type of network concerned. In this case, the mobile terminal only has to scan the various pilot signal frequencies.

At least some of the networks 20–60 do not have a pilot or beacon signal. In this case the mobile terminal 10 seeks radio energy sources. The mobile terminal 10 may include a selection of access protocols and may attempt to use these to see if any radio access technology can be identified.

The mobile terminal may receive some assistance in determining local uncoordinated networks. For example, most mobile telephone systems have a method of sending messages to mobile terminals camped on a cell or in active communication, e.g. the Cell Broadcast system of UMTS may be used to broadcast to all mobile terminals in a cell details of the frequencies and access technologies of local private networks within the cell. Alternatively, this information can be transmitted directly to the mobile by a Location Service. Such services are triggered when the UTRAN and/or core network determines the location of the mobile terminal (e.g. by a GPS position sensor in the mobile terminal 10) to be within a certain distance of the networks 30, 40 and sends a SMS message directly to that mobile terminal. The SMS message displays on the visual display of the mobile terminal 10. The message may provide system details of radio access networks within range of the mobile terminal and may also include an Internet URL where suitable software may be downloaded to re-configure the mobile terminal 10 so as to be able to access the relevant network 30, 40. For instance, a protocol stack for a software defined mobile receiver could be downloaded using the existing connection to UMTS 20 before making a blind access to the relevant network 30, 40.

Returning to FIG. 6, when the RNC 22 has received the service request, the measurement report and the RAB assignment from the SGSN 74, it decides which service is best suited to provide the service with the required QoS. Aspects which the RNC 22 uses for the decision may be the load on the UMTS network 20, the bandwidth, data rate and allowed transmission delay, the signal quality of the various networks as measured by the mobile terminal 10, the available spectrum. If the service would be better provided by another network the RNC 22 decides to initiate a system redirection or handover. Optionally, the SGSN 74 may interrogate the HLR 72 to find out if the mobile terminal is authorized to access the new network. This information may be recorded in the HLR 72 which is connected to a VLR for the circuit switched domain and to the SGSN 74 for the packet switched domain. The storage of information relating to a mobile terminal in core network 70, e.g. permission set for networks 30, 40 does not mean that the core network is coordinated with networks 30, 40. Coordination in accordance with the present invention requires interchange or updating of system parameters of the relevant system. A permissions set of a mobile terminal is not a sst of system parameters.

Figure 7:
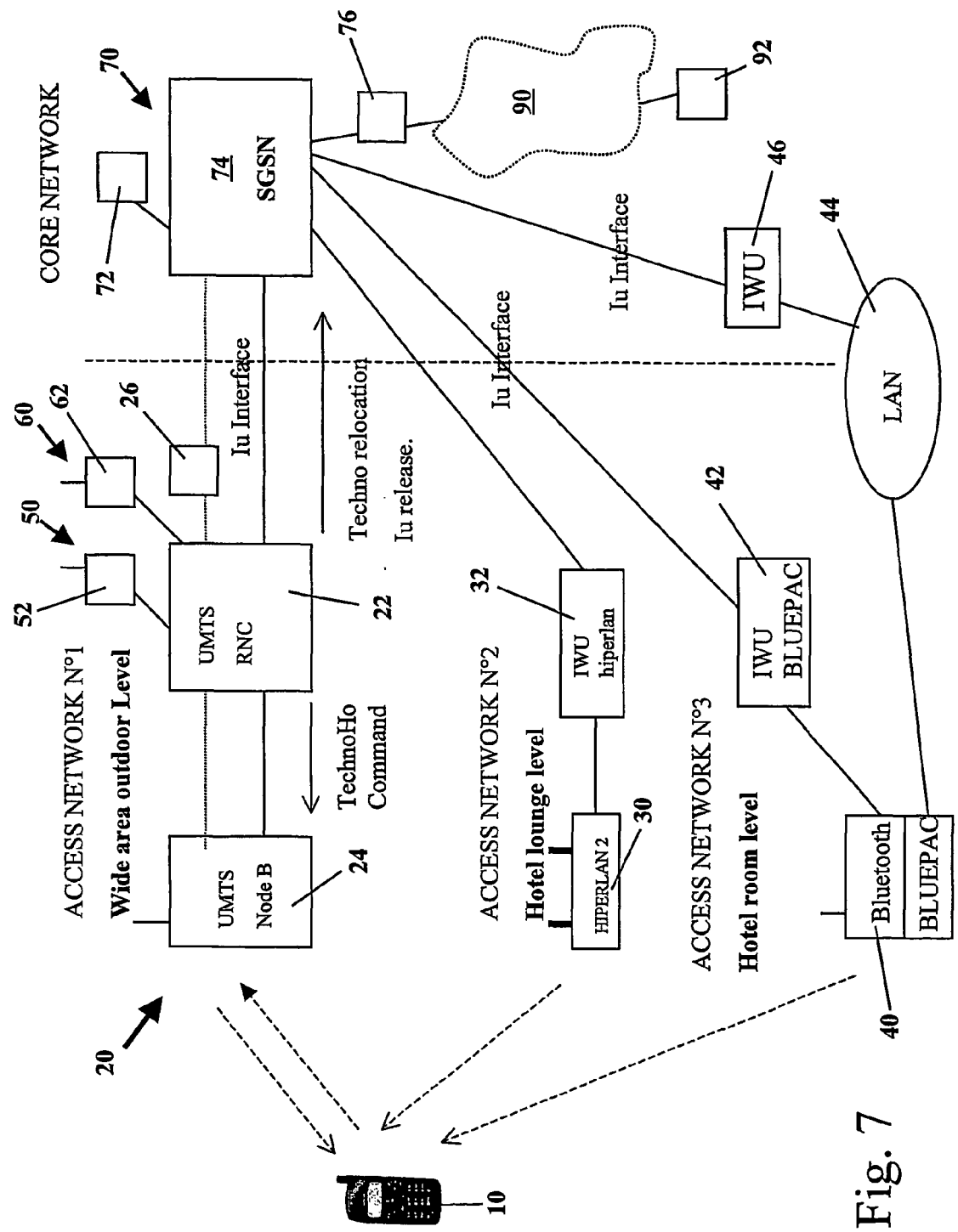
Figure 8:
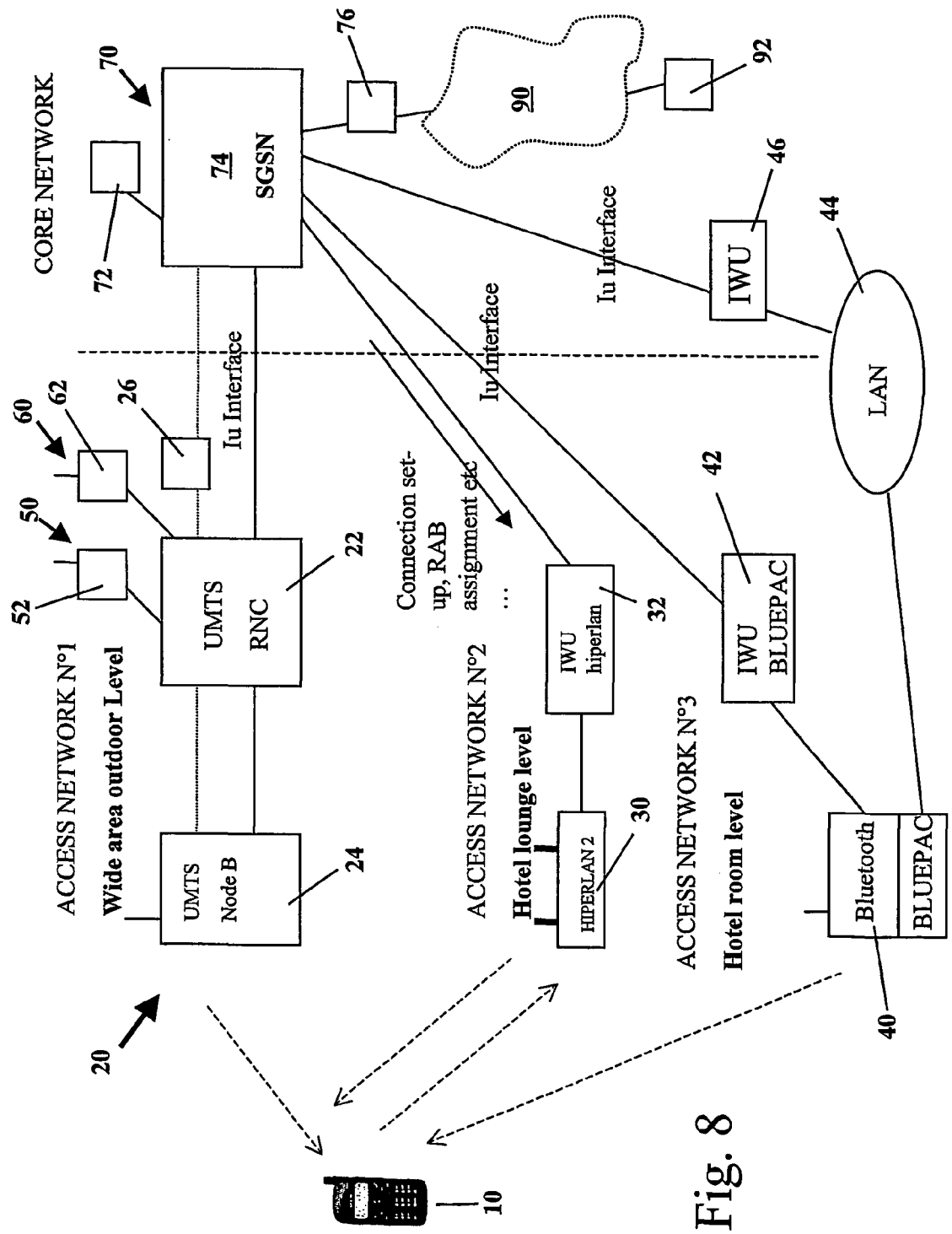

The RNC 22 then sends a message instructing the SGSN 74 that a RAB relocation to another network is required and to request release of the connection to the UMTS network 20 (FIG. 7). The SGSN 74 receives the request for a new RAB for connection to another network. The SGSN 74 prepares the new routing path to the selected network. To do so it sets up a path with the relevant IWU 32, 42, 46, e.g. to the IWU 32 of the HIPERLAN 30 (FIG. 8). To do this the SGSN 74 must either know of the network address of the relevant IWU 32, 42, 46 (to make connection directly via a wireline, e.g. a leased line) or must know the IP address of these to make a connection via the Internet. Such information may be stored in a look-up table in the SGSN 74. Messages destined for the mobile terminal 10 are tunneled to the network address of the relevant IWU 32, 42, 46 either via the direct network connection or via the Internet.

The RNC 22 then instructs the mobile terminal 10 with a DSPA command to which network the mobile terminal 10 will be handed over (FIG. 7). The mobile terminal 10 begins to synchronize with the new network 30 by carrying out the appropriate log-on procedure. The SGSN 74 diverts the current data stream to the IWU 32 (FIG. 8), for instance. To do this the SGSN 74 encapsulates the received frames and tunnels these to IWU 32 using the IWU 32 network address. IWU 32 unpacks these messages and makes any translation of protocols to those used on the HIPERLAN 30 and vice versa. The connection to the mobile terminal 10 and all resources in the UMTS network 20 are then released. The SGSN 74 and the HLR 72 can maintain location information for the mobile terminal 10. That is, after handover, a location update can be performed by the mobile terminal 10 through the new network 30. It is preferred if each local network such as HIPERLAN 30 has an individual location area identification in the UMTS network 20 and core network 70. The new identification is then recorded in the HLR 72 associated with the subscriber when there is no local HLR in the new network. On paging, the HLR 72 is interrogated and returns the location area of the new network. Paging messages are then tunneled to the relevant IWU 32, 42, 46. Each IWU 32, 42, 46 is configured to generate the required signaling on the local network 30, 40, 44 to page the mobile terminal 10 in that network. In order to avoid unnecessary paging on local networks a clean-up procedure may be implemented. Because a mobile terminal 10 will probably only be using a local network 32, 42, 44 for short periods, the reference in HLR 72 to the local network may be replaced by a default location after a certain time, e.g. 24 hours, and/or e.g. if a location update request initiated by the core network 70 made to the last known IWU 32, 42, 46 does not produce a response from the mobile terminal 10.

Figure 9:
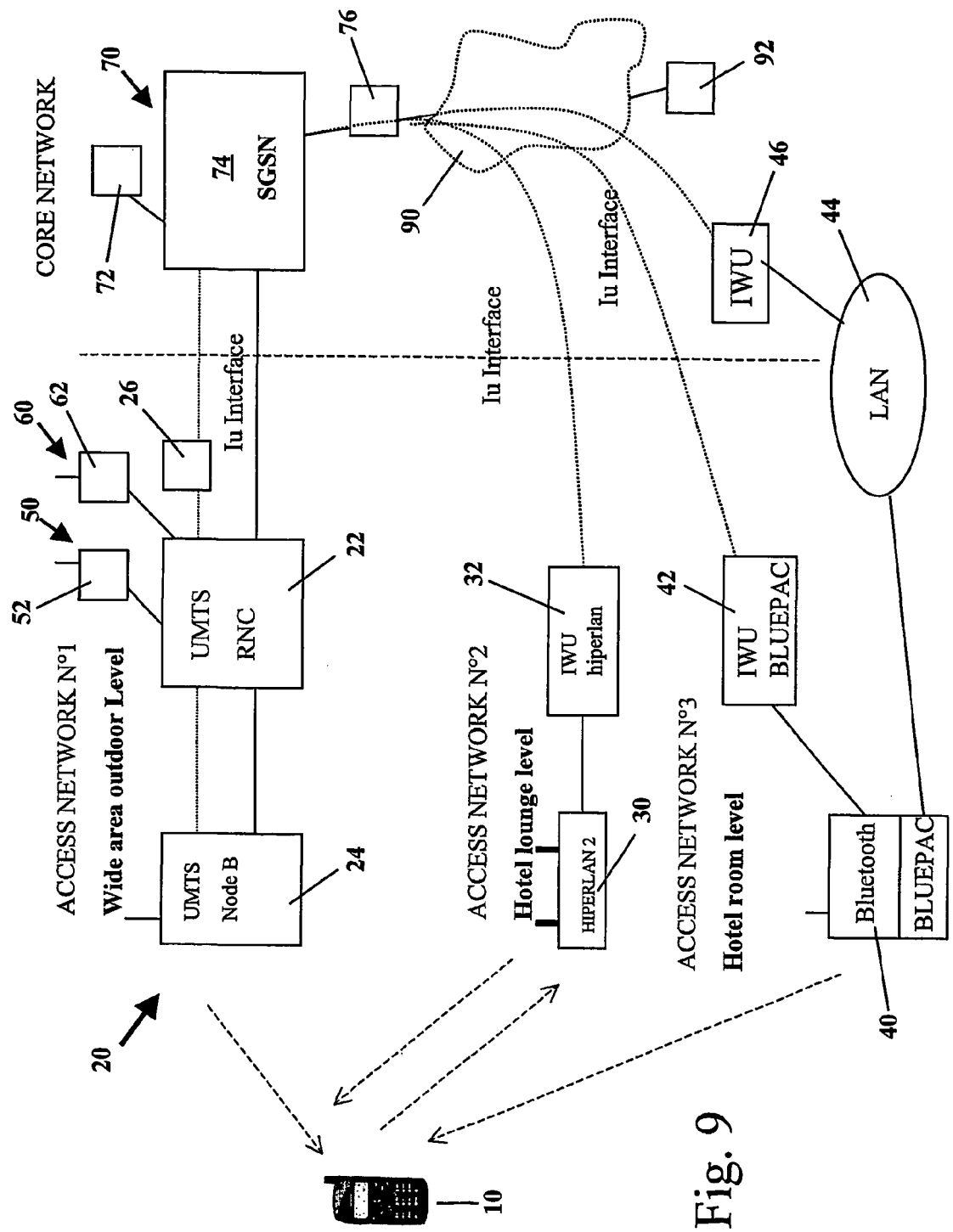
FIG. 9 shows a further embodiment of a multi-system mobile telephone network in accordance with the present invention

FIG. 9 is a schematic representation of a further network in accordance with the present invention. The difference with respect to the embodiments of FIGS. 4 to 8 is that the connection between the SGSN 72 and the IWU 32, 42, 46 is through the Internet 90. This means that when redirecting messages to the local networks 30, 40, 44 the SGSN tunnels the messages to the IWU 32, 42, 46 via the Internet network. The SGSN 72 encapsulates these messages and then sends them to the IP address of the IWU 32, 42, 46. This network architecture is less preferred because the use of the Internet can cause delays and uncertain packet delivery.

Figure 10A:
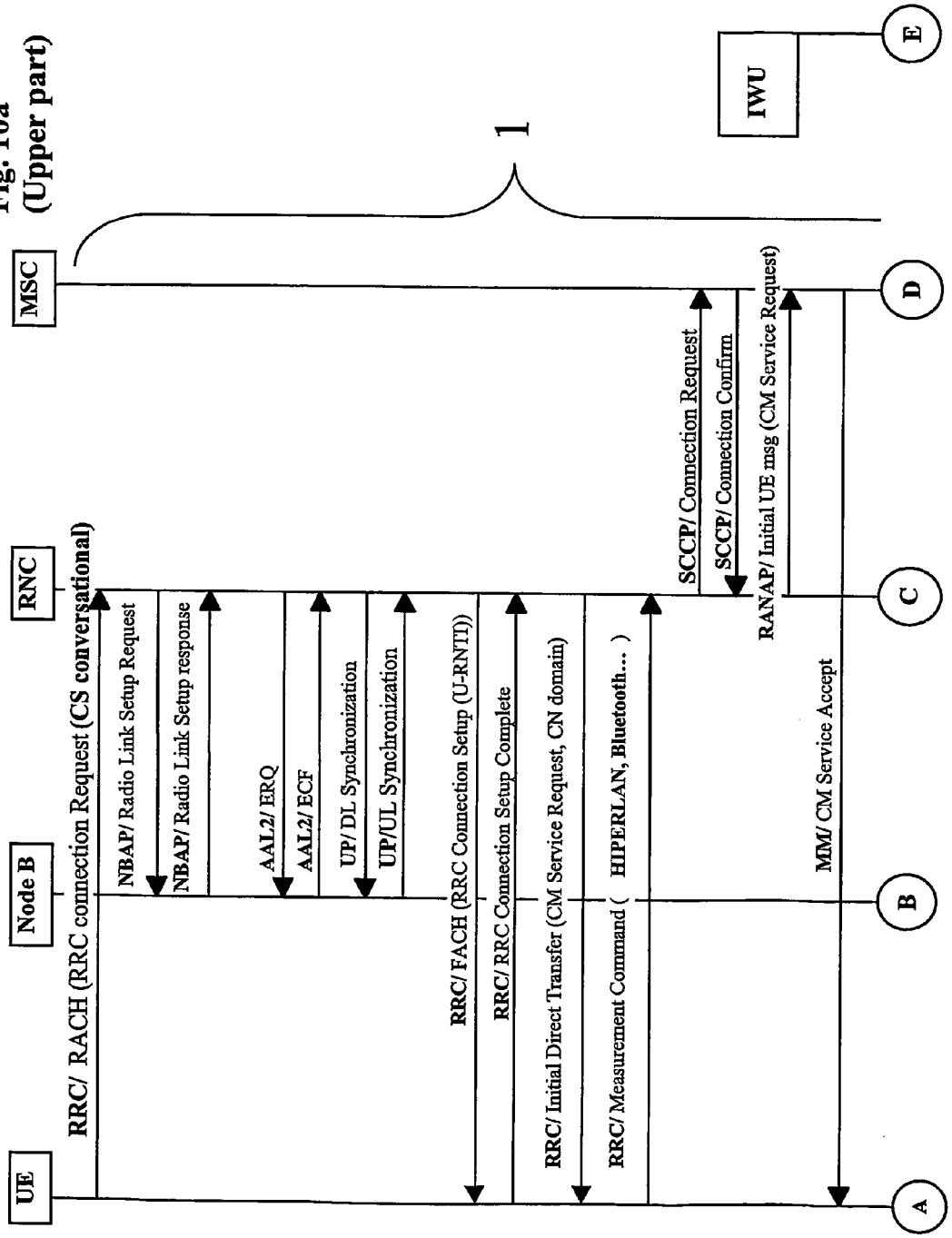
FIG. 10a shows a message flow in accordance with an embodiment of the present invention.
Figure 10B:
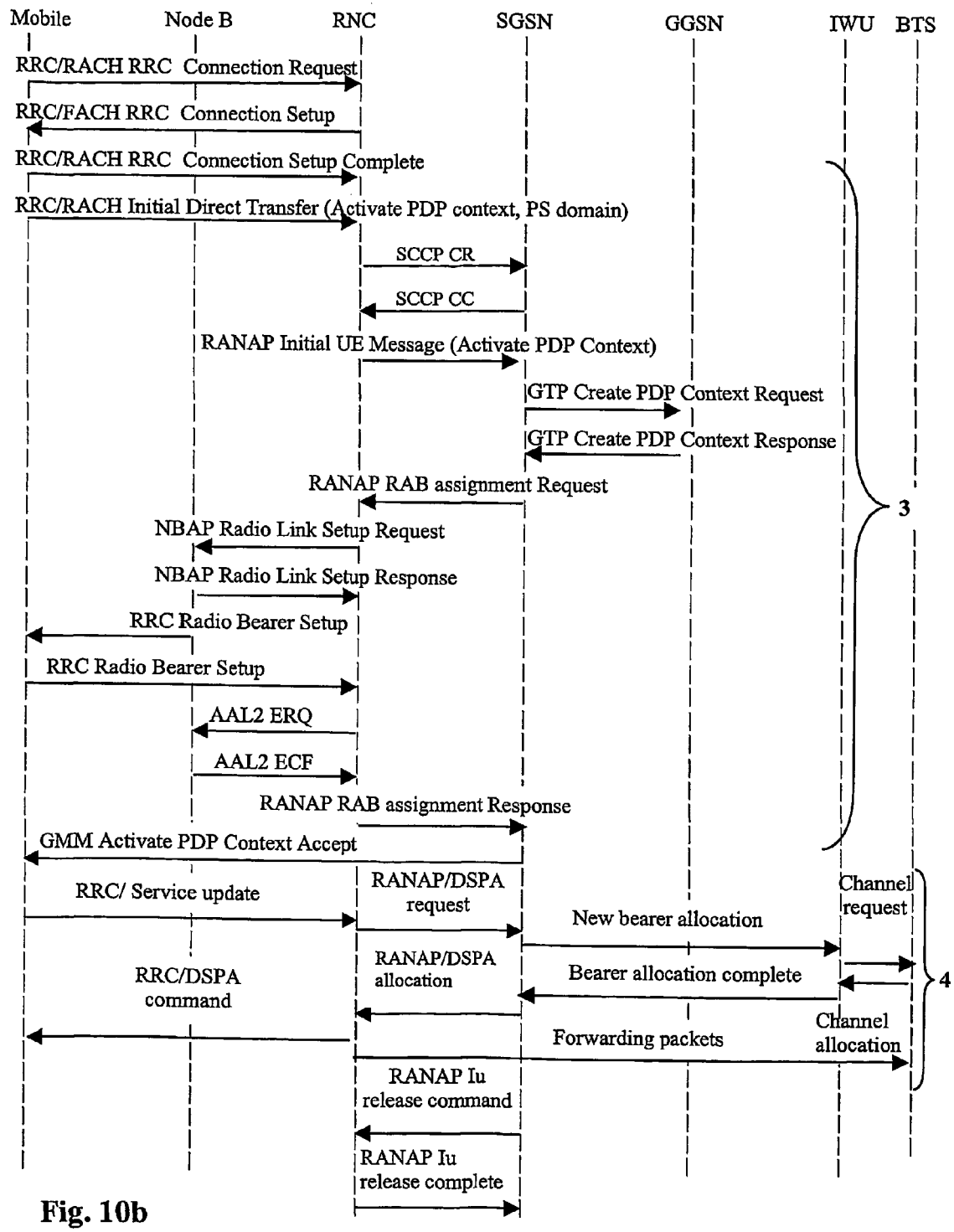
FIG. 10b shows a message flow in accordance with an embodiment of the present invention.

Message flows in accordance with a further embodiment of the present invention are shown in FIGS. 10*a* and *b*. FIG. 10*a* relates to the setting up of a conventional circuit switched (CS) connection (e.g. voice call) followed by a RAT change request to a data service in accordance with an embodiment of the present invention. FIG. 10*b* relates to the setting up of a conventional packet switched (PS) connection (e.g. data call) followed by a RAT change request to a data service in accordance with another embodiment of the present invention.

In FIG. 10*a* the first set of messages (1) relate to setting up a normal CS connection in a UMTS network 20 and allocation of a RAB and are only relevant to the present invention in as far as they illustrate one mode of initial operation of the network. The second set of messages (2) relates specifically to the present invention. The RAT changeover procedure starts with a service update request from the mobile terminal 10. This request is treated in the same way as the service request in the previous embodiment. Messages sent by the mobile terminal in embodiments of the present invention, e.g. the measurement report, may be sent on dedicated channels, i.e. after the setting of at least one connection with a mobile telecommunications network, or on an access channel, a random access channel (RACH) or a fast access channel (FACH). The remaining steps are as previously described. Hence, also in this embodiment, the mobile terminal 10 is the initiator of the process which results in a system handover. On receipt of the service update request, the RNC determines whether a new RAB is required, i.e. a change of RAT based on the measurement report from the mobile terminal. If a new RAB is required this is requested (RANAP/techno relocation) from the SGSN 74. The SGSN 74 then requests a new bearer allocation from the relevant IWU 32, 42, 46. The IWU responds with an acknowledgement that the bearer on the other network is complete. The SGSN 74 then transmits a conformation to the RNC that the RAT handover is authorized. The RNC then sends the RAT handover command to the mobile terminal which begins the log-on procedure to the relevant network. The SGSN then instructs the RNC to release the communication on the UMTS system 20 which is acknowledged by the RNC. In this procedure some packets may be lost, particularly if the mobile terminal takes a long time to log-on to the new network. To prevent this, packets which cannot be delivered may be stored at the RNC in a buffer and then transmitted to the new network via the SGSN and the relevant IWU once the communication with the mobile terminal via the new network is complete. Alternatively or additionally, the packets may be stored in a buffer in the relevant IWU awaiting the completion of the log-on procedure of the mobile terminal.

In FIG. 10*b*, the first set of messages (3) relates to the set up of a conventional PS data call. For PS transmissions, activation of a packet data protocol (PDP) context is mandatory in UMTS. A PDP context contains references to QoS associated to the communication, RAB attributes, access point name (APN) of the network to be accessed, etc. The second set of messages (4) relates specifically to the present invention. The RAT change procedure starts with a service update request from the mobile terminal 10. This request is treated in the same way as the service request in the previous embodiment, e.g. by assignment of a RAB and the issuance of a handover command to the mobile terminal. FIG. 10*b* relates to the use of IWU 42 and its interworking with a BlueTooth base station (BTS). On receipt of the service update request from the mobile terminal the RNC decides whether a change of RAT is required and, if so, requests a new bearer from the SGSN. The SGSN transmits a request to the IWU 42. The IWU 42 relays the request via the LAN 44 to a BluePac base station which can be a network element on the LAN 44. The BTS assigns a radio channel and transmits a channel allocation confirmation request to the IWU 42. This in turn confirms the allocation of a new bearer to the SGSN. The SGSN confirms to the RNC that the new bearer is allocated and the RNC instructs the mobile terminal to change RAT to the BluePac network 40 with a DSPA command. At the same time all received packets are buffered at the RNC and forwarded to the IWU 42 when the mobile terminal has logged on. Once communication to the mobile terminal by tunneling to the IWU from the SGSN has been established (all buffered packets at the RNC having been forwarded) the SGSN instructs the RNC to release all communication in the access network 20, i.e. Iu interface.

In the above description the question of IP addresses and mobility has not been discussed. It is considered that the present invention is not limited by the particular method used to provide mobility in an IP network, nor is it dependent upon it. Various solutions have been proposed and standardization has not been achieved, see, for example, the article "IP Services over BlueTooth: leading the way to new mobility", by Albrecht et al. IEEE, 1999, as well as "All IP architectures for cellular networks", by Uskela, "SIP services and interworking with IPv6" by Flykt et al., "Name resolving and routing in mobile networks", Giaffreda et al., "First step toward an IP-based VHE" by Morand et al., "IPv6 on Everything: the new Internet", by Ladid, "The Impact of IPv6 on wireless networks", by Worrall, "Network Architecture for IP/PSTN/3G integration: the wineglass proposal", by Coata et al. all from 3G Mobile Communication Technologies, 26–28 Mar. 2001, Conf. Publication No. 477 IEE London. In the methods and apparatus of the present invention the TCP/IP layers of transmission need not be influenced or changed. The SGSN 74 can tunnel messages either in accordance with a conventional Mobile IP protocol (e.g. via the network) or via direct lines using the network addresses of the relevant IWU 32, 42, 46. The SGSN 74 may provide a "home agent" functionality and the IWU 32, 42, 46 a "foreign agent" functionality. It is anticipated that a temporary identifier will be required to identify the mobile terminal and this temporary identifier will need to be associated with an IP address and even with a local address, e.g. within a Local Area Network. Such assignments and manipulations of local IP addresses are dealt with between the SGSN 74 and the IWU 32, 34, 36 of the relevant network. It is anticipated that any suitable method of allocating local and dynamic IP addresses may be adapted to the present invention.

The reverse handover procedure from one of the local networks 30 to 60 to the UMTS network 20 may also be performed. If the local IWU 32, 42, 46 supports the necessary messaging the inverse procedure can be initiated from the local network IWU 32, 42, 46. Alternatively, the mobile terminal 10 can make a forward handover directly to the UMTS network 20. One node of the various networks is common, in this case the SGSN 74. In the forward handover the mobile terminal 10 provides all information as to the present communication to allow the core network 70 to identify the call and arrange handover.

The RAT changeover with respect to networks 50 and 60 will now be described. In case of network 50, the network is served by the SGSN 74. In this case the system handover can be affected directly from the SGSN 74 through the existing RNC 22. However, the service request procedure, allocation of a RAB and scanning of the available radio resources by the mobile terminal 10 remains the same.

In the case of the unidirectional network 60, no complete handover of the system as such is carried out. Instead, there is a split between the uplink and downlink channels the uplink going via the UMTS FDD network and the downlink going via the unidirectional network. To meet a service request, e.g. for the download of a high date rate and/or a large sized file, the RNC 22 makes a relocation request to SGSN to select the unidirectional system. In this case, the SGSN directs downlink traffic to base station 62 which is part of the node B 24 or to a node B of an alternative RNC 64. Uplink traffic continues via the UMTS system, e.g. for requesting retransmission of blocks with errors and other signaling.

While the invention has been shown and described with reference to preferred embodiments, it will be understood by those skilled in the art that various changes or modifications in form and detail may be made without departing from the scope and spirit of this invention. E.G. after the relocation of the RAB to a new network, a routing update may be performed if a more optimal IP route is available to the new location.

The invention claimed is:

1. A method of operating at least a first and a second mobile telecommunications network connected through at least one common node, the first network comprising a first access network and a core network and the common node being in the core network, a mobile terminal being in radio communication with the first mobile telecommunications network, the method comprising the steps of:
the mobile terminal scanning a frequency spectrum and identifying at least a potential radio access network;
the mobile terminal communicating a report of the results of the scan to the first network,
the mobile terminal sending a message to the first telecommunications network with a request for specific mobile telecommunications service,
the first network deciding in response to the report and the request which of the radio networks detected by the scan of the mobile terminal is suitable for the requested service, and
the first radio network requesting the common node to redirect at least a part of the communication to the second network.

2. The method according to claim 1, wherein the second network is uncoordinated with the first network.

3. The method according to claim 1, wherein the radio access technology of the first network is different from the radio access technology of the second network.

4. The method according to claim 1, further comprising the step of the first network transmitting a message to the mobile terminal, the message including system parameters of the second network.

5. The method according to claim 4, wherein the message is broadcast to the mobile terminal.

6. The method according to claim 4, wherein the message is transmitted depending upon the location of the mobile terminal.

7. The method according to claim 1, wherein the redirection is via a wireline.

8. The method according to claim 1, wherein the redirection is via a wide area multimedia IP telecommunications network.

9. The method according to claim 1, wherein the first network is a cellular network.

10. The method according to claim 1 further comprising a Radio Network Controller (RNC) in the first network determining whether a new Radio Access Bearer (RAB) is required based on the measurement report from the mobile and, if so, requesting a new Radio Access Bearer (RAB) from the common node in the core network.

11. The method according to claim 10 further comprising the common node in the core network requesting a new bearer allocation from an inter working unit (IWU) of the second network and receiving an acknowledgement when the bearer is allocated.

12. The method according to claim 11 further comprising the common node sending a confirmation to the Radio Network Controller (RNC) when the handover is authorized.

13. The method according to claim 12 further comprising the Radio Network Controller (RNC), in response to receiving the handover authorization, sending a handover command to the mobile and the mobile beginning a log-on procedure to the second network.

14. The method according to claim 13 further comprising the common node requesting the first network to release communication.

15. The method according to claim 13 further comprising buffering packets from the mobile during the log-on procedure to the second network.

16. The method according to claim 1 wherein the common node is a Serving GPRS Support Node (SGSN).

17. A system having at least a first and a second mobile telecommunications network connected through at least one common node, the first network comprising a first access network and a core network and the common node being in the core network, a mobile terminal being in radio communication with the first mobile telecommunications network, comprising:
means in the mobile terminal for scanning a frequency spectrum and identifying potential radio network sources;
means in the mobile terminal for communicating a report of the results of the scan to the first network,
means in the mobile terminal for sending a message to the first telecommunications network with a request for specific mobile telecommunications service,
means in the first network for deciding in response to the report and the request which of the radio network sources detected by the scan of the mobile terminal is suitable for the requested service, and means in the first radio network for requesting the common node to redirect at least a part of the communication to the second network.

18. The system according to claim 17, wherein the second network is uncoordinated with the first network.

19. The system according to claim 17, wherein the radio access technology of the first network is different from the radio access technology of the second network.

20. The system according to claim 17, wherein the first network is a cellular network.

21. A network element for use in a first network of a system having at least a first and a second mobile telecommunications network, the first network comprising a first access network and a core network and the common node being in the core network, the network element comprising:

means for receiving from a mobile terminal in radio communication with the first mobile telecommunications network a report of the results of a scan of a frequency spectrum and identification of potential radio network sources, means for receiving from the mobile terminal a request for specific mobile telecommunications service, and means for deciding in response to the report and the request which of the radio networks detected by the scan is suitable for the requested service, and means for requesting the common node to redirect at least a part of the communication to the second network.

* * * * *